2,891,228

COMPOSITIONS AND HEATING ELEMENTS PRODUCED THEREFROM

Robert Smith-Johannsen, Niskayuna, N.Y., assignor, by mesne assignments, to S-J Chemical Company, Niskayuna, N.Y., a copartnership No Drawing. Application August 24, 1955
Serial No. 530,426

11 Claims. (Cl. 338—262)

This invention relates to electrically conductive compositions and films, and heating elements made therefrom and to the process of producing the same. More particularly, the invention relates to electrically conductive compositions, films, and heating elements made therefrom, produced by firing a composition comprising finely divided silica and a finely divided zinc of controlled alkali content at temperatures of about 1000° F. The resulting compositions and films are useful in the manufacture of heating elements such as dryers, toasters, irons, hot plates, radiant heaters and the like.

According to the present invention, the high temperature inorganic conductive compositions and films are prepared by forming a mixture of finely divided silica and finely divided zinc in which the amount of zinc is in excess of the equivalent amount which would theoretically react with the silica as zinc oxide to form a zinc silicate in a suitable medium of controlled alkali content. The mixture is then fired at a temperature of about 1000° F. or above for a sufficient length of time to render the mixture conductive.

The electrically conductive compositions and films of this invention are very abrasive-resistant and have excellent electrical and physical properties. The films when ground down by an emery wheel, for example, exhibit a metallic sheen. The films may be subjected to watt densities varying from about 100 watts to about 200 watts per square inch for considerable periods of time without burn-out occurring. The films are also electrically stable and maintain a constant resistance at high watt densities and temperatures. The films exhibit a positive temperature coefficient of resistance at high temperatures up to and above 1600° F.

The invention includes the compositions themselves and as self-sustaining electrically conductive bodies which may be used as resistance elements, such as resistors, and composite heating elements which have the electrically conductive compositions applied as a thin film to suitable insulating materials.

Self-supporting electrically conductive compositions may be produced in accordance with this invention by applying the compositions to backing members having a parting agent between the backing members and the applied compositions. The compositions, together with backing members, may then be fired according to this invention, and the conductive compositions then stripped from the backing members. An example of a suitable parting agent is graphite. Unsupported compositions may also be produced by coating the compositions on heavy paper, such as cardboard, and then firing the compositions together with the paper. The paper is burned off during the firing operation, leaving the self-supporting electrically conductive compositions.

In making a composite heating element, the compositions before firing may be applied to the backing member by various suitable means, such as by brushing, spraying, or dipping, to the thickness desired. I have found that a film thickness of betwen about 2 to 10 mils is advantageous. The applied films, together with the backing members, are then fired at temperatures of about 1000° F. or higher to render the films electrically conductive. The firing of the compositions applied to a backing member as a film together with the backing member also strongly adheres the films to the backing members.

The invention further comprises heating elements formed from the compositions of the present invention by firing the composition between pieces of insulating materials such as ceramics or refractory materials. The compositions may be applied to an insulating material as a film and fired at a temperature of about 1000° F. or higher, electrodes applied to the film, and another ceramic or refractory material fired onto the conductive film. The subsequent firing of the refractory material, such as an enamel frit in water, on top of the conductive film does not adversely affect the physical or electrical properties of the film. The electrically conductive compositions when sandwiched between fired layers of insulating materials such as enamel or ceramic have the advantage of being inert, durable, heat resistant, attractive, and easy to clean. The cover layers also provide electrical, mechanical, and chemical protection for the conductive films.

The invention also comprises heating elements having electrodes fired directly on the conductive films or compositions of the present invention for application of the electrical contacts. It is advantageous to connect the electrical contacts by means of suitable electrodes, covering a suitable area of the conductive compositions, to more evenly distribute the current over the entire area of the composition or film and avoid hot spots at the points of contact. Different types of electrodes may be applied as desired; however, I have found that silver-glass frit electrodes are advantageous, and particularly so if the heating elements are to be used at high temperatures. Silver-glass frit electrodes may be fired directly on the compositions and films of this invention, and will not penetrate the compositions or films nor disrupt their electrical properties in any manner. Zinc or aluminum powder may also be used as electrodes and may be utilized to form heating elements for lower temperature operation. The electrical contacts may be connected to the electrodes by any suitable means which will withstand the operating temperatures contemplated for the heating elements. For high temperature operation, I have found that a mechanical connection such as a stainless steel screw and bolt connection, is advantageous. Nicrom connections may also be used for high temperature operation.

The size and shape of the backing members to which the compositions of the present invention may be applied will vary depending upon the type of heating element, such as a hot plate, in which it is desired to use the supported conductive compositions. The compositions of the present invention may be applied to insulating articles of various sizes and shapes, such as rods, bars, sheets, tubes and the like.

The compositions of the present invention may be applied to different compatible insulating bases or backing materials. A porous base is advantageous in that the composition may be applied and fired thereon more easily than on a smooth surfaced base, but a smooth surface may, however, be used. The particular base to which the compositions are to be applied should not be adversely affected by the firing of the compositions to render them conductive, nor in the subsequent use of the composite heating elements. Nor should the base adversely affect the desired electrical or physical properties of the conductive films or compositions. The insulating base chosen should have a coefficient of expansion similar to that of the electrically conductive compositions. The coefficient of expansion of the compositions of the present invention will of course vary depending upon the particular components and the amounts thereof utilized to form the compositions. For example, compositions of the present invention having a coefficient of expansion of roughly $3-4 \times 10^{-6}$ per degree centigrade may readily be applied to and used with a backing member having a coefficient of expansion of $1 \times 10^{-6}$ or $10 \times 10^{-6}$. The backing members should also have sufficient thermal shock resistance to withstand the operating conditions of the heating elements made in accordance with the present invention. A backing member which is an excellent insulator having a high resistance is advantageous. The backing member should also maintain a fairly high resistance throughout the temperature range calculated for operation of the heating element. It is also advantageous to employ a backing member having a softening point higher than the temperature at which the compositions of the present invention are to be fired.

Various insulating materials having the necessary and advantageous compatibilities as discussed above, such as enamels, ceramics, quartz, magnesium aluminum silicates, and the like may be used as base members for the conductive compositions of the present invention.

Silica from various sources, soluble or sol, may be used to form the electrically conductive compositions, films, and heating elements of this invention, so long as the silica utilized, or the composition from which the silica is derived, does not contain or produce during the manufacturing process any compound or material which will prevent the formation of or adversely affect, the physical or electrical properties of the resulting product. Special precautions may be necessary to achieve the conductive compositions, films and heating elements with different types of silica as illustrated by the following examples.

One source of silica which may be utilized to form the films of the present invention is a very fine colloidal silica marketed under the trade name "Ludox" by E. I. du Pont de Nemours Company. "Ludox" is a silghtly alkaline silica and is marketed as a water slurry containing about 30% solids. It is composed of about 29–31% $SiO_2$, 0.29–0.39% $Na_2O$, and a maximum of 0.15% sulfates, as $Na_2SO_4$. The silica particles are extremely small, ranging from about 0.01 to 0.03 micron in maximum dimensions. The method of obtaining and the properties of "Ludox" are described in U.S. Patent 2,574,902.

Another source of silica which may be utilized to form the electrically conductive film of the present invention is a very fine silica marketed under the trade name "Aerosil" by Godfrey L. Cabot Inc. "Aerosil" is a vapor phase silica of extremely high chemical purity, or submicroscopic fineness and contains little or no alkali.

Silica obtained from the pyrolysis or controlled hydrolysis of organo silicates such as the various alkyl or aryl orthosilicates, may also be used to form the compositions, films, and heating elements of this invention. Some examples of silicates that may be used are tetraethyl ortho silicate, condensed ethyl silicate and ethyl silicate 40 marketed by Carbide and Carbon Chemical Corporation.

When using the hydrolyzed or partially hydrolyzed form of organo silicates, the silica may be formed in situ. One manner of forming the compositions and films, using tetraethyl orthosilicate, for example, is to mix the tetraethyl orthosilicate with water and an emulsifying agent. The zinc and a hydrolysis inducing agent is then thoroughly intermixed with the emulsion. Sodium methyl silicate may advantageously be used as a hydrolysis inducing agent. This mixture is then coated onto a suitable base member and allowed to stand for a few minutes to permit hydrolysis of the tetraethyl orthosilicate and the film to become substantially dry. The composition is then fired in a furnace at about 1000° F. according to the present invention.

In forming the compositions, films, and heating elements of the present invention by a pyrolysis reaction from an organo silicate, the finely divided zinc is dispersed throughout the organo silicate, applied to a suitable backing and fired directly in a furnace at a temperature in excess of about 1000° F. and advantageously at about 1500° F. or higher.

The alkali content of the zinc-silica suspensions or mixtures must be carefully controlled in order to form the new electrically conductive compositions and films of this invention. If the alkali content of the zinc-silica mixtures is too high during the firing operation, the resulting product has no physical strength, burns out violently at very low watt densities, and has a negative coefficient of resistance at low temperatures. The alkali used can be in various forms such as $Na_2O$, NaOH, $K_2O$ and the like. I have found that it is advantageous to supply the alkali to the zinc-silica mixtures in the form of $Na_2O$ and for the purpose of this invention the amounts of alkali will be expressed as $Na_2O$. When using an alkali different from $Na_2O$, such as $K_2O$, the weight or percentage of the base actually present can be calculated to a weight or percentage of $Na_2O$ which is equivalent on the basis of alkalinity by molar equivalence. For example, 94 parts by weight of $K_2O$ is equivalent to 62 parts by weight of $Na_2O$. The alkalinity present can also be determined by volumetric titration with a standard acid and the acid used calculated to $Na_2O$ as is well known in the art.

I have found that the maximum amount of alkali useable is about 3% by weight expressed as $Na_2O$ and based on the weight of silica present in the mixture. If the alkali is much in excess of this amount, the composition after being fired has little physical strength, and burns out at low watt densities. Proper alkali control during the firing operation results in compositions which have very high physical strength, do not burn out at high watt densities, and possess positive coefficients of resistance at high temperatures, e.g. 1600° F. and above.

The electrically conductive compositions and films can be produced from zinc-silica mixtures which contain very little alkali as is illustrated in the following examples, however, I have found that it is advantageous, and exceptionally good results are obtained, by providing an $Na_2O$ content (or an equivalent amount of other alkali) in the zinc-silica mixtures during the firing operation of at least about 1% by weight based on the silica present in the mixture. The mixtures of zinc and silica containing at least about 1% by weight $Na_2O$ develop increased uniformity of resistance and stability upon firing over the compositions produced from zinc-silica mixtures containing less than 1% by weight $Na_2O$.

As illustrative of some compositions of varying amounts of silica and $Na_2O$, a composition containing 100 parts zinc, 15 parts $SiO_2$ and about 0.15 part $Na_2O$ has a high resistance after firing while a fired composition containing 100 parts zinc, 60 parts $SiO_2$ and about 0.6 part $Na_2O$ has a low resistance. A fired mixture containing 100 parts zinc, 31.5 parts $SiO_2$ and 0.7 part $Na_2O$ has a high conductivity and a low resistance of about 0.1 ohm. While the resistance of a fired mixture of 100 parts zinc, 33 parts $SiO_2$ and about 1.1 parts $Na_2O$ tends to collapse at high temperatures, when it starts to glow it indicates a runaway tendency of the composition.

Mixtures of different silicas and silicates may also be advantageously employed as illustrated by the following examples.

The temperatures used to fire the compositions of the present invention in order to render them conductive are important. The particular temperature used will depend upon a number of variables such as the backing material supporting the composition, the particular zinc-silica ratio present in the composition, and the time of firing. Compositions having high silica content generally require higher temperatures than compositions having a low silica and a high zinc content. For example, a composition containing about 12 parts by weight of "Ludox" silica containing about 29–31% $SiO_2$ and about 20 parts by weight zinc dust can be rendered conductive by firing it at about 1000° F. for about 35 minutes. For the above formulation, a firing temperature of about 1100° F. for about 30 minutes has, however, been found to be advantageous. For a composition containing 64 parts by weight of "Ludox" silica containing 29–31% $SiO_2$ and 36 parts by weight of zinc dust, the firing temperature is somewhat higher. I have found that the above composition should be fired at a temperature of about 1400° F. or higher to render it conductive within a reasonable time. Temperatures in excess of 1400° F. can also be used. I have used temperatures of about 1700° F. in firing high silica content compositions and have found that the stability is, at times, increased. When firing a high silica content composition at about 1450° F., the firing time would be about 5 to 10 minutes depending up the thermal capacity of the base material to which the composition has been applied. The major portion of the time during which the compositions are being fired is consumed in bringing the compositions and backing materials up to the high temperature since the compositions and backing materials are highly resistant to heat. After the compositions have been brought up to a temperature of about 1000° F. conductivity developes in a few minutes. Compositions having a low silica content and high zinc content can be fired at temperature of about 1000° F. The low silica content compositions are advantageously fired at about 1100° F. and at this temperature the firing time would be about 30 minutes. The firing temperature should also be sufficiently low as to not adversely affect the supporting backing material.

The amount of zinc dust that may be incorporated with the silica in order to produce the films of the present invention may vary within fairly wide limits. However, in order to render the films conductive upon firing, the amount of zinc dust should be in excess of the amount of silica present on a parts by weight basis, or in other words, the proportions of zinc to silica in the films should be in excess of the amount required to form zinc silicate from all of the silica. If the amount of zinc dust present is less than a chemical equivalent amount of silica, substantially no conductivity results. The amount of zinc may also be present in proportions substantially over equal parts by weight of the silica present. The term "excess zinc" is used to mean zinc in excess of that which would theoretically combine with all the silica in the composition to form a zinc silicate, and produce an electrically conductive composition when fired according to the present invention. It is essential, however, that there be present a sufficient amount of silica to form a continuous film and to create the oxidation protection necessary for film life at high temperature. I have made conductive compositions and films employing 5 parts of zinc dust to 1.2 parts of "Ludox" (30% solids) together with 1 part of water and 0.5 part of "Goodrite K–710" sodium polyacrylate thickener.

With pure "Ludox" silica, for example, the zinc dust proportions may be varied between about 20 and 50 parts by weight for 64 parts of "Ludox" silica to control and vary the resistance of the films between approximately 2 ohms per square inch and 1,000 ohms per square inch.

The compositions of the present invention should be fired in the presence of oxygen. Air is a suitable and advantageous source of oxygen. The amount of oxygen or air may be readily determined by one skilled in the art. Oxygen may also be supplied from some suitable internal source such as evolution thereof from chemical reaction during the heating of the compositions.

It has also been found that the zinc-silica ratio not only affects the conductivity of the films, but also determines the temperature coefficient of resistance of the films. A high proportion of silica is conducive to a higher positive temperature coefficient of resistance. I have produced electrically conductive compositions and films having a positive temperature coefficient of resistance at 1600° F. and above.

For a given zinc-silica ratio, the resistance of the fired mixtures will vary directly as the amount of alkali is increased. For a given amount of silica in a zinc-silica suspension, the amount of alkali determines the conductivity of the fired film. For a given alkali content in the zinc-silica suspension, the zinc-silica ratio becomes operative in determining the conductivity of the fired compositions. Advantageous results are obtained by using a given amount of alkali, just enough to cause complete compatibility and uniformity of heat development, and controlling the resistance by varying the zinc-silica ratio.

I have also found it to be advantageous to first mix the finely divided zinc with a small amount of sodium silicate, apply the zinc-sodium silicate to the desired surface, then impregnate the zinc-sodium silicate film with a low alkali silica such as "Ludox," and then fire the impregnated film to render it conductive according to the invention. In using this method, it is desirable to add a wetting agent such as water to the sodium silicate-zinc mixture in order to form a mixture which is capable of being uniformly applied to the surface desired. The amount of sodium silicate must be sufficiently low so that the total parts by weight of alkali, or $Na_2O$, based on the total amount of silica present does not exceed about 3% by weight. As will be apparent to those skilled in the art, the impregnation of such sodium silicate-zinc compositions with a low alkali content silica such as "Ludox" will lower the alkali proportion in the suspension. The amount of sodium silicate used will thus depend upon the amount of low alkali content silica applied to or impregnated into the sodium silicate-zinc mixture. The $Na_2O$ content of the particular sodium silicate used will also have to be taken into account. Upon impregnation of the sodium silicate-zinc composition with a low alkali-high silica product, the ratio of $Na_2O$ to $SiO_2$ is considerably reduced and the amount of low alkali silica should be sufficient to reduce the total $Na_2O$ content of the mixture to about 3% by weight or below based on the silica present.

It is advantageous at times to add a thickening agent to the silica-zinc suspensions in order to increase the viscosity and facilitate their application to smooth surfaces. Various thickening agents may be used to accomplish this result, however, I have found that "Goodrite K–710" marketed by the Goodrich Company is particularly suitable. "Goodrite K–710" is a 30% solution of sodium polyacrylate.

Thickening agents such as sodium polyacrylate are organic, and I have found that when even a small amount of the thickening agent is added to a silica-zinc composition having only a slight excess of zinc, that the sodium polyacrylate burns out at high firing temperatures. The burning out of the thickening agent disrupts the films in some manner and renders them non-conductive. I have found, however, that if the proportions of zinc dust are increased sufficiently over the silica equivalent, the films become conductive upon firing.

Another method of more easily securing the zinc-silica compositions of the present invention to non-porous insulating backing members is first to coat the non-porous or smooth surfaced backing member with an insulating porous coating. Different types of porous coatings may be applied to a smooth surface to accomplish this, provided their properties will not be unduly affected by the subsequent firing of the conductive films. A porous coating having the properties hereinbefore set forth with respect to the conductive compositions is advantageous.

I have found that it is particularly advantageous to use a composition similar to the composition used to produce the conductive films of the present invention which are non-conductive and porous. Such non-conductive films may be prepared by mixing a low zinc content silica composition together with a sufficient amount of an organic thickening agent to render the films non-conductive when fired at a temperature of about 1000° F. or higher. An advantage of using such a non-conductive cover coating is that it has very similar properties to the conductive films themselves and will not be unduly affected by the firing of the conductive film thereover, nor adversely affect the conductive film. The porous insulating films form a non-flowing porous base for the conducting films.

The films of the present invention may also be applied to insulated metals such as a suitably insulated steel. The metal upon which the film is to be formed should, however, have a coefficient of expansion roughly approximating the coefficient of expansion of the insulating layer and the conductive coating. The insulating coating used should also have the necessary properties compatible with the conductive films as hereinbefore discussed. Various insulating materials may be used to insulate the steel, such as ordinary enamel frit. Steels with a coefficient of about $10 \times 10^{-6}$ are advantageous.

The invention also comprises mixtures of finely divided silica and zinc of controlled alkali content which have a long shelf life permitting the mixtures to be prepared well in advance of their transformation into conductive compositions. Mixtures containing a high silica and low zinc content, such as mixtures containing 20 parts by weight zinc dust and 20 parts by weight "Ludox" silica having 29–31% $SiO_2$, or 36 parts by weight zinc dust and 64 parts by weight "Ludox" silica having 29–31% $SiO_2$, have a relatively short shelf life. After compounding mixtures of similar zinc content as those noted above, the compositions should be fired within about 15 minutes. When such compositions become too old, the compositions fired in accordance with the present invention are no longer continuous and have no physical strength, nor do they develop conductivity upon firing. I have found that the zinc-silica suspension stability can be considerably increased, giving the mixture a long shelf life, by using a slightly different zinc-silica ratio and continuously agitating the mixture. For example, a mixture containing 5 parts by weight $SiO_2$ and 20 parts by weight zinc has a short shelf life of about 15 minutes, whether continuously agitated or not, while a mixture containing about 3.6 parts by weight $SiO_2$ and 20 parts by weight zinc which has been continuously agitated for about 24 hours can still be fired to form conductive compositions and has a shelf life in excess of 24 hours. The time of continuous agitation may be less than or more than 24 hours, depending upon the particular zinc-silica ratio in the mixture. For any particular ratio the necessary time of agitation can be routinely determined.

The invention also includes the method of stabilizing the new conductive compositions and film of this invention towards cycling. As hereinbefore pointed out, the silica-zinc mixtures are rendered conductive by firing at temperatures of about 1000° F. in a few minutes. The conductive compositions however, tend to increase in resistance during cycling. For example, when the conductive composition produced in Example 1 was subjected to cycling by running the film at 6 watts per square inch for a definite on-time, and cooling it to 0° F. it was found to increase in resistance by about 6% on each cycle.

I have found that the conductive compositions and films of this invention can be rendered stable towards cycling by a heat stabilization treatment. The time and temperature of heating will be mainly determined by the degree of stability desired. I have found that if the conductive compositions are heat treated at a temperature of about 1100° F. for 10 to 12 hours that the compositions exhibit good stability towards cycling.

I have also found that the stability towards cycling of the conductive compositions can be further improved and rendered completely stable by applying a colloidal silica slurry such as a 30% solids "Ludox" composition to the conductive films after they have been heat stabilized towards cycling. After the silica coating has been applied it is dried in air. After the silica coating has been dried, it can then be fired again for a few minutes at about 1000° F. if desired.

The cycle stability of the conductive compositions can also be advantageously improved by submerging or soaking the composition in a "Ludox" slurry for a few minutes before it is fired to render it conductive as set forth in the examples. It is also advantageous to follow this treatment with the heat stabilization treatment.

The following specific examples, in parts by weight, illustrate various methods of forming the compositions, films and electrical heating elements of the present invention:

*Example 1*

A thin layer of a suspension of 64 parts by weight of "Ludox" silica containing about 30% $SiO_2$, 0.29 to 0.31% $Na_2O$ and a maximum of 0.15% $Na_2SO_4$ and 36 parts by weight of zinc dust was sprayed on a backing member of unglazed refractory material having the necessary compatibility properties, and then allowed to air dry to remove at least most of the water. The dried film was not electrically conductive. The dried film was placed in a furnace and heated to a temperature of about 1450° F. for a period of about 5 to 10 minutes until the film glowed, and was then removed from the furnace and cooled. Silver-glass frit electrodes were then fired directly on the conductive film at 1200° F. The resulting films had a positive temperature coefficient of resistance and maintained the same all the way up to about 1600° F. The film was subjected to a watt density of 120 watts per square inch before any indication of failure could be observed. The film was further subjected to a watt density of 115 watts per square inch for over 75 hours without failure of the film electrically or physically, and without any measurable change in the resistance of the film. The film developed a resistance of approximately 10.0 ohms per square.

Usually a sufficient amount of water is present in the "Ludox" slurry to thoroughly and uniformly disperse the zinc dust throughout the silica slurry. If desired, however, water may be added to facilitate the mixing and application of the composition uniformly to a suitable backing material.

*Example 2*

10 parts of zinc dust and 1 part of aerosil silica together with 20 parts of ethyl alcohol were thoroughly mixed together and sprayed on a compatible quartz body and allowed to air dry to remove at least most of the alcohol. The initial film after drying consisted only of deposited powder and exhibited no cohesion of any consequence. The dried film was not electrically conductive. The dried film was placed in a furnace and fired at a temperature of about 1450° F. for a period of 10 minutes, then removed from the furnace, cooled, and silver-glass frit electrodes fired on the film at 1200° F. The resulting film had a positive temperature coefficient of resistance and maintained the same all the way up to about 1600° F. The film was subjected to a watt density of 120 watts per square inch without burnout or any indication of failure.

The use of ethyl alcohol as a dispersing medium for the silica and zinc dust in the above example may be replaced by various other suitable dispersing media, such as toluol, as long as the dispersing medium does not adversely affect the formation of the film by chemical reaction with the components present or cause the development of cracks either before or after firing of the film.

Example 3

10 parts of ethyl silicate (partially hydrolyzed liquid polymer) were mixed with 10 parts of zinc dust and sprayed on a flat compatible porous ceramic sheet and the wet film placed directly into a furnace heated to a temperature of 1500° F. and fired at this temperature for about 10 minutes. Electrodes were then fired on the film. The resulting film exhibited physical and electrical performance characteristics similar to the zinc "Ludox" composition as described in Example 1.

In forming the conductive compositions by a pyrolysis reaction with ethyl silicate it is advantageous to use a polymer. The lower molecular weight ethyl silicate polymers or monomers are highly volatile, and it is quite difficult to disperse the zinc throughout these low molecular weight polymers, or monomers, and apply them to a backing before a substantial portion of the ethyl silicate evaporates. The highly volatile nature of the ethyl silicate polymer used also necessitates placing the applied film and backing member directly in a furnace which was heated to a temperature higher than ordinarily necessary, namely, 1500° F., to prevent any substantial loss by evaporation of the polymer before pyrolysis.

Example 4

10 parts of a 20% solution of a sodium silicate having a silica-sodium oxide ratio of 3.22:1 (Philadelphia Quartz Grade N), 3.5 parts "Ludox" silica (30% solids slurry), 10 parts of water and 10 parts of zinc dust were thoroughly mixed in a suitable vessel and coated on a compatible porous insulating enamel surface and dried to remove the majority of the water. The dried film was then fired in a furnace for about 5 to 10 minutes at about 1450° F. and removed from the furnace, cooled, and silver-glass frit electrodes fired on the film at 1200° F. The resulting film had excellent abrasive resistance, and when ground down exhibited a metallic sheen. The film was subjected to watt densities of up to 160 watts per square inch without failure of the film and without any noticeable change in the resistance.

Example 5

2.5 parts of a 20% solution of sodium silicate having a silica-sodium oxide ratio of 3.22:1 (Philadelphia Quartz Grade N) were mixed with 7.5 parts "Ludox" silica (30% solids) and processed in the same manner as in Example 4 and a similar product was produced as in Example 4.

Example 6

10 parts of a 20% solution of a sodium silicate having a silica-sodium oxide ratio of 3.22:1, 0.5 part Aerosil silica, 10 parts zinc dust and 10 parts water were mixed and applied to a compatible insulating ceramic surface and fired at about 1400° F. Electrodes were fired directly on the fired films. The films had a burn-out power density of about 120 watts per square inch.

Example 7

10 parts by weight of "Ludox" silica containing about 30% $SiO_2$, 0.29–0.39% $Na_2O$ and a maximum of 0.15 $Na_2SO_4$, 25 parts by weight zinc dust and 2.5 parts by weight Goodrite K-710 sodium polyacrylate (30% solution) were thoroughly mixed and applied to a smooth-surfaced ceramic in a thin layer and fired in a furnace for about 5 minutes at 1450° F. Electrodes were fired directly on the conductive coating. The resulting heating element exhibited a positive temperature coefficient of resistance up to about 1000° F.

The following is a typical example of a method of producing a heating element on smooth surfaced materials, such as refractory materials and metals, by first applying thereto a porous insulating coating:

Example 8

10 parts by weight of "Ludox" silica containing about 30% $SiO_2$, 0.29–0.39% $Na_2O$ and a maximum of 0.15 $Na_2SO_4$, 10 parts by weight zinc dust and 2.5 parts by weight Goodrite K-710 sodium polyacrylate (30% solution) were thoroughly mixed and applied to a smooth surfaced compatible ceramic. The film, after being dried, was then fired at a temperature of about 1450° F. for about 5 to 10 minutes. After the film had cooled it exhibited no electrical conductivity. The coating composition in Example 1 was then applied to the non-conductive film and rendered conductive in the same manner as described in Example 1. The resulting film had similar physical and electrical properties as the film produced in Example 1.

The insulating coating in the above examples may similarly be applied to a metal base, coated with the composition of the present invention, and subsequently fired.

Example 9

A thin layer of a suspension of 64 parts by weight of "Ludox" silica containing about 30% $SiO_2$, 0.29 to 0.31% $Na_2O$ and a maximum of 0.15% $Na_2SO_4$ and 36 parts by weight of zinc dust was thoroughly mixed and applied to a compatible porous ceramic surface and dried. The film and ceramic backing were then heated in a furnace at a temperature of about 1450° F. for about 5 to 10 minutes. The film and backing were then cooled and the silver-glass frit electrodes were then fired directly on the conductive coating at 1200° F. A "Ludox" silica slurry was then coated over the electrodes to protect them and air dried. An enamel frit in water was then sprayed on top of the conductive film and electrodes in a sufficient amount to form an enamel coating approximately 2 mils in thickness, and fired thereon in a furnace at about 1500° F. The firing of the insulating cover layer over the conductive layer did not adversely affect the physical or electrical properties of the conductive films. Various types of compatible insulating coatings, as hereinbefore discussed, such as enamels, ceramics, or other protective cover layers may be used to cover the films of the present invention. The type of insulating material chosen will also depend upon the properties desired in the cover layer. The ceramic cover layer may of course be applied over conductive films which have been placed on the metallic base with an insulating layer.

The subsequent firing of an insulating cover layer over the conductive films having electrodes fired thereon, such as silver-glass frit electrodes, will tend to cut through the electrodes and at times cause considerable leakage. I have found that this may be obviated by first covering the electrode with a zinc silicate film or by merely wiping them with a "Ludox" slurry as in the above example. The protective layer of the electrodes prevents any loss of conductivity of the electrodes during subsequent firing of a ceramic layer thereover.

The following examples illustrate methods of further stabilizing the conductive compositions, films and heating elements of the present invention:

Example 10

10 parts by weight of "Ludox" silica containing about 30% $SiO_2$, 0.29–0.39% $Na_2O$ and 0.15% $Na_2SO_4$ was mixed with 20 parts by weight zinc dust and deposited on a compatible porous ceramic backing and fired in a furnace at 1100° F. for about 30 minutes. The resulting film was electrically conductive but tended to increase in resistance upon cycling. The conductive film and backing was then heated at about 1100° F. for about 11 hours. Silver-glass frit electrodes were fired on the film and when it was cool, the surface was sprayed with "Ludox" colloidal silica and air dried. The product was run at 21 watts per square inch for a definite "on" time and was then cooled to 0° F. for six successive cycles. There was no measurable change in resistance. The resistance was calculated at constant voltage after a definite "on" time.

Example 11

10 parts by weight of "Ludox" silica containing about 30% $SiO_2$, 0.29–0.39% $Na_2O$ and 0.15% $Na_2SO_4$ was mixed with 10 parts by weight zinc dust and applied to a compatible porous ceramic backing member and air dried. This film was then submerged in a "Ludox" colloidal silica suspension for approximately two minutes, air dried, and then fired in a furnace at about 1700° F. for five minutes. Silver-glass frit electrodes were then applied and the composite article fired at 1200° F. to fuse the electrodes.

This film was run at 17.8 watts per square inch and became 90% stabilized in five minutes. There was no change in resistance from one hour to 12 hours. After running the film at 17.8 watts per square inch for 12 hours, the film was cycled four times by cooling the film to 0° F. and running the film at 17.8 watts per square inch for a definite "on" time. The film showed no change in resistance. The film was then run at 35 watts per square inch for five minutes, cooled to 0° F. and put back at the original wattage. No change in resistance had taken place. The film was then run at 95 watts per square inch for five minutes, which caused the entire area to glow uniformly bright red. The film was then cooled to 0° F. until equilibrium was established and placed again at the original wattage. Equilibrium was established at exactly the same resistance as before. After a two-hour period of further continuous running the same cycle at 95 watts per square inch followed by 0° F. exposure, the film showed no increase in resistance due to cycling.

Example 12

4 parts by weight of "Ludox" silica containing about 30% $SiO_2$, 0.29–0.39% $Na_2O$ and a maximum of 0.15 $Na_2SO_4$, 10 parts by weight zinc dust and 0.5 part by weight Goodrite K–710 sodium polyacrylate (30% solution) were thoroughly mixed and applied to a cylindrical bar composed of a compatible porous refractory material and air dried. The coated bar was then immersed in a "Ludox" colloidal silica slurry for about 5 minutes and air dried. The coated bar was then fired in a furnace at a temperature in excess of 1450° F. for about 10 minutes and after the coating began to glow, the coated bar was removed from the furnace and cooled. Silver-glass frit electrodes were then applied to the ends of the bar and fired thereon in a furnace at a temperature of 1200° F. Stainless steel clamp electrical contacts were then attached to the electrodes. After running the heating element at 35 watts per square inch for a considerable length of time, there was no measurable change in resistance beyond the change taking place initially.

Example 13

20 parts by weight of zinc dust were thoroughly dispersed throughout 12 parts by weight of "Ludox" silica having 29–31% $SiO_2$ and 0.29–0.39% $Na_2O$ and the mixture continuously agitated for about 24 hours. A portion of the mixture was then applied to a quartz plate and fired at a temperature of 1100° F. for 30 minutes. The fired composition was electrically conductive and gave approximately 3 ohms per square inch resistance. The mixture was then permitted to further age (after it had been agitated for 24 hours and without further agitation) and applied to a quartz plate and fired at 1100° F. for 30 minutes. The fired composition was also electrically conductive and gave approximately 3 ohms per square inch resistance.

Another mixture containing 20 parts by weight zinc dust and 20 parts by weight of "Ludox" silica having 29–31% $SiO_2$ and 0.29–0.39% $Na_2O$ was prepared and applied to quartz plate and fired at the temperature of 1100° F. for 30 minutes within 15 minutes after the mixture was prepared. The fired composition was electrically conductive and gave approximately 3 ohms per square inch resistance. The same mixture after aging for 24 hours with and without continuous agitation did not develop conductivity upon firing. The firing composition was not continuous and had little physical strength. Continuous agitation of the mixture for 24 hours failed to have any effect on the stability of the mixture and a film fired after agitation failed to exhibit conductivity. The film was not continuous and had little physical strength.

Example 14

20 grams of zinc dust, 10 grams of water and 1 gram of a sodium silicate having an $SiO_2$—$Na_2O$ ratio of 3.22:1 were thoroughly mixed and applied to a ceramic surface and impregnated with "Ludox" silica in sufficient amount to reduce the alkali content to below about 3% by weight based on the total silica present. The mixture was then fired in air at about 1100° F. for a sufficient time to render the composition conductive. The conductive composition exhibited absolutely uniform temperature development and stability at high resistances in excess of 10 ohms per square.

The electrically conductive compositions and films of the present invention are very abrasive-resistant, and exhibit a smooth metallic sheen when ground down. There is also no evidence of the original silica or zinc particles. The zinc, although in excess of that which could theoretically chemically combine with the silica, is not subject to oxidation at high temperatures. The compositions and films may be readily heated to temperatures far in excess of the melting point of zinc and even in excess of the boiling point of zinc for a short period of time without adversely affecting the physical or electrical properties. When heated to these high temperatures there is no evidence of softening or melting of the composition or films, but they remain hard and abrasive-resistant.

This application is a continuation-in-part of my earlier filed application Serial No. 437,575, filed June 17, 1954, now abandoned.

I claim:

1. The process of making electrically conductive compositions and films which comprises heating in the presence of oxygen a mixture of finely divided silica, and an excess of finely divided zinc containing at least about 1 percent and not more than about 3 percent by weight of alkali expressed as $Na_2O$ based on the silica present, said zinc being present in excess of the amount required to form zinc silicate from all of the silica.

2. The process of claim 1 in which the mixture is heated to above about 1000° F.

3. The process of making electrically conductive compositions and films which comprises mixing finely divided zinc with a sodium silicate, applying the zinc-sodium silicate mixture to an insulating base member, impregnating the applied mixture with a low alkali content silica suspension in a sufficient amount to reduce the amount of alkali expressed as $Na_2O$ and based on the silica present to at least about 1 percent but not more than about 3 percent by weight, to form a coated base member, said zinc being present in excess of the amount required to form zinc silicate from all of the silica, and firing the coated base member in the presence of oxygen to render the coating electrically conductive.

4. The process of making electrically conductive compositions and films which comprises mixing finely divided silica with an excess of finely divided zinc and at least about 1 percent but not more than about 3 percent by weight of alkali expressed as $Na_2O$ based on the silica present, applying the mixture to an insulating base member, said zinc being present in excess of the amount required to form zinc silicate from all of the silica, impregnating the applied mixture with a low alkali silica slurry, and firing in the presence of oxygen the impregnated mixture together with the base member to render it conductive.

5. The process of making electrically conductive compositions and films which comprises mixing finely divided silica with an excess of finely divided zinc and at least about 1 percent but not more than about 3 percent by weight of alkali expressed as $Na_2O$ based on the silica present, applying the mixture to an insulating base member, said zinc being present in excess of the amount required to form zinc silicate from all of the silica, firing in the presence of oxygen the mixture together with the base to render it conductive, and impregnating the fired conductive mixture with a silica slurry of low alkali content.

6. A new composition of matter comprising finely divided silica, an excess of finely divided zinc and at least about 1 percent but not more than about 3 percent by weight of alkali expressed as $Na_2O$ based on the silica present, said zinc being present in excess of the amount required to form zinc silicate from all of the silica present.

7. A composite electrically conductive heating element which comprises a compatible insulating base member, a mixture of finely divided silica, an excess of finely divided zinc and at least about 1 percent but not more than about 3 percent by weight of alkali expressed as $Na_2O$ based on the silica present and containing an amount of zinc in excess of the amount required to form zinc silicate from all of the silica fired on a surface of the base member, electrodes fired in the presence of oxygen directly on the fired mixture, electrical contacts connected to the electrodes, and a compatible insulating cover fired on top of the fired conductive mixture to form a composite heating element having an electrically conductive composition sandwiched and adhered between layers of fired insulating material.

8. The process of making a stable alkaline silica-zinc mixture which comprises mixing finely divided silica with an excess of zinc together with at least about 1 percent but not more than about 3 percent by weight of alkali expressed as $Na_2O$ based on the silica present, said zinc being present in excess of a zinc-silica proportion of 4 to 1, and agitating the mixture.

9. Stable alkaline silica-zinc mixtures comprising finely divided silica, an excess of finely divided zinc and at least about 1 percent but not more than about 3 percent by weight of alkali expressed as $Na_2O$ based on the silica present, said zinc being present in excess of a zinc-silica proportion of 4 to 1, and agitating the mixture sufficiently to render the mixture stable.

10. The process of making stable electrically conductive compositions and films which comprises mixing finely divided silica with an excess of finely divided zinc in an aqueous medium containing at least about 1 percent but not more than about 3% by weight of alkali expressed as $Na_2O$ based on the weight of silica present, said zinc being present in excess of the amount required to form zinc silicate from all of the silica, applying the mixture to an insulating base member, firing the mixture in the presence of oxygen together with the base to render it conductive, heat stabilizing the conductive composition by heating it at about 1000° F. for about 10 hours, and applying a low alkali content silica slurry to the heat stabilized composition.

11. The process of making stable electrically conductive compositions and films which comprises mixing finely divided silica with an excess of finely divided zinc in an aqueous medium containing at least about 1 percent but not more than about 3% by weight of alkali expressed as $Na_2O$ based on the weight of silica present, said zinc being present in excess of the amount required to form zinc silicate from all of the silica, applying the mixture to an insulating base member, drying the mixture to remove the majority of the aqueous medium, firing the mixture in the presence of oxygen together with the base at a temperature of about 1000° F. for about 30 minutes to render it conductive, heat stabilizing the conductive composition by heating it at a temperature of about 1000° F. for about 10 hours and coating the heat stabilized conductive composition with a silica slurry containing no more than about 3% by weight of alkali expressed as $Na_2O$ based on the weight of silica present in the slurry.

References Cited in the file of this patent

UNITED STATES PATENTS

| | | |
|---|---|---|
| 1,922,221 | Steenbeck et al. | Aug. 15, 1933 |
| 2,106,578 | Schwartzwalder et al. | Jan. 25, 1938 |
| 2,264,285 | Bennett | Dec. 2, 1941 |
| 2,509,875 | McDonald | May 30, 1950 |
| 2,576,308 | Nordon | Nov. 27, 1951 |
| 2,597,562 | Blodgett | May 20, 1952 |
| 2,648,752 | Saunders | Aug. 11, 1953 |
| 2,673,817 | Burns | Mar. 30, 1954 |
| 2,703,486 | Ford | Mar. 8, 1955 |

OTHER REFERENCES

Phillips' "Glass," 2nd ed., Pitman Publishing Co., New York, N.Y., 1948 (only pp. 99–103 relied upon).